Oct. 29, 1940.  H. W. PLEISTER  2,219,788
NAIL EXPANSION
Filed Nov. 8, 1938  3 Sheets-Sheet 1

Henry W. Pleister
INVENTOR
BY Alanky Johnson
ATTORNEY

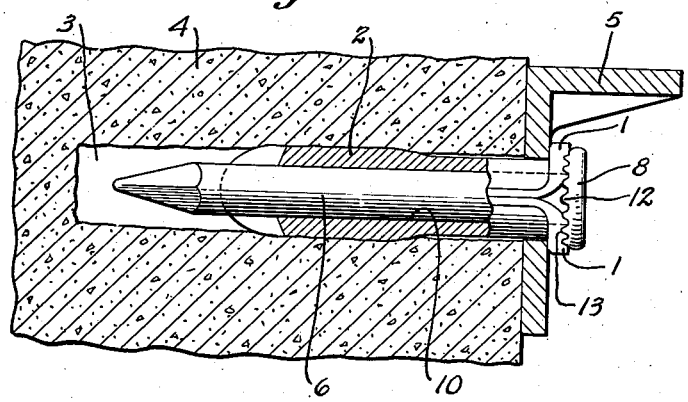
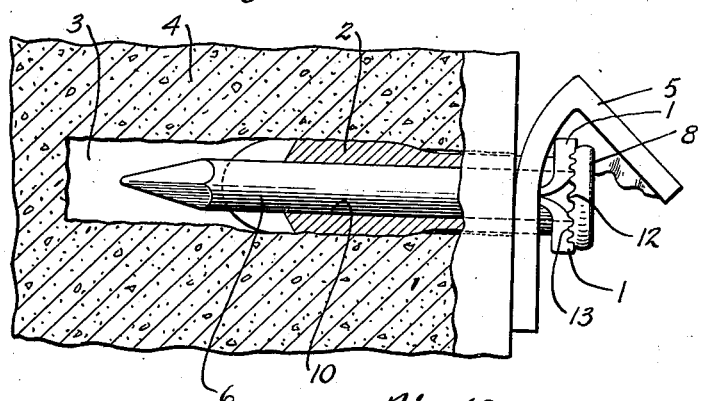
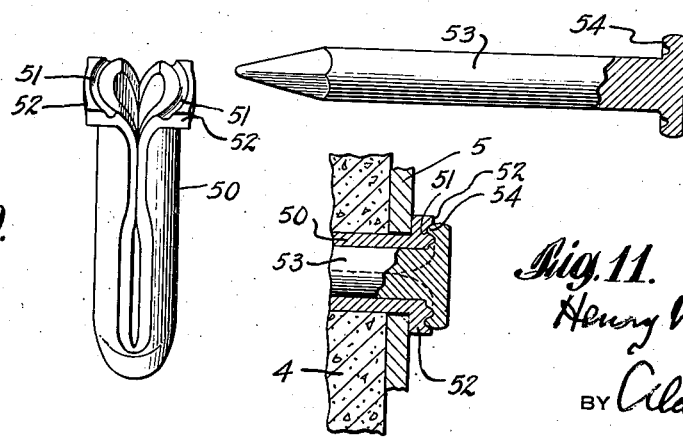

Oct. 29, 1940.  H. W. PLEISTER  2,219,788
NAIL EXPANSION
Filed Nov. 8, 1938  3 Sheets-Sheet 3

Harry W. Pleister
INVENTOR

BY Alan W Johnson
ATTORNEY

Patented Oct. 29, 1940

2,219,788

UNITED STATES PATENT OFFICE 2,219,788

NAIL EXPANSION

Henry W. Pleister, Westfield, N. J., assignor to Diamond Expansion Bolt Company, Inc., Garwood, N. J., a corporation of New Jersey Application November 8, 1938, Serial No. 239,501

5 Claims. (Cl. 85—28)

My invention is an improvement in nail expansions.

My present invention is more particularly an improvement on U. S. Patent 1,501,054, John Karitzky, granted July 15, 1924; and upon U. S. Patent 1,746,963, Henry W. Pleister and John Karitzky, granted February 11, 1930.

While the nail fasteners covered by these patents are eminently satisfactory in use, immense quantities having been sold and are now in use, by my present invention I am enabled to materially increase the holding bond or grip of said nail fasteners. This is very important in that a nail fastener, covered by my present invention, will, by actual tests, materially raise the point of failure over and above the point of failure of a similar size nail fastener, covered by the patents above mentioned.

In a large number of rigid tests in an accurate testing machine under exactly the same conditions, the average additional holding power of my improved nail expansion was found to be eleven per cent (11%) greater than the nail expansions covered by the patents above mentioned.

In actual practice this insures that an excessive overload thrown on my improved nail fastener will not cause it to fail, letting the work drop; whereas the same excessive overload would cause the old nail fasteners, above mentioned, to wholly or partially fail. Not only is the margin of safety, for a given size nail fastener, increased, but my improved nail fastener will do the work normally required of a larger nail fastener. Such a larger nail fastener, costs more and requires that a larger hole be drilled in the concrete, brick, masonry, or other support with the attendant increase in cost of installation.

For purposes of description, I have shown two forms of my improved nail fastener, but it is, of course, to be understood that these are merely by way of example, and that my invention is to be limited only by my claims, and not by particular forms shown by way of illustration.

My invention further relates to combinations, and sub-combinations, and articles of manufacture, as will be more fully hereinafter described and pointed out in the claims.

In the accompanying drawings, Figs. 1 to 11, I have illustrated my new invention, and to "explain the principle thereof and the best mode . . . to distinguish it from other inventions" Revised Statutes, Sec. 4888, I have illustrated in Figs. 12 to 14, how the old form fails under an excessive overload.

Fig. 7 is a vertical section through the work, and support, the nail shield being broken away for purposes of illustration.

Fig. 8 is a view similar to Fig. 7, in which the work 5 has failed under an excessive overload, without severing or mutilating the flanges or lips of the nail expansion shield.

Fig. 9 is a perspective view of a modification in which the flanges or lips of the nail shield are provided with locking means in the form of arcuate grooves.

Fig. 10 is a nail provided with a circular locking ring, to fit into the locking arcuate groove of the modification shown in Fig. 9.

Fig. 11 is a fragmentary, horizontal section, illustrating the cooperation between the locking means illustrated in Figs. 9 and 10.

Figure 12:
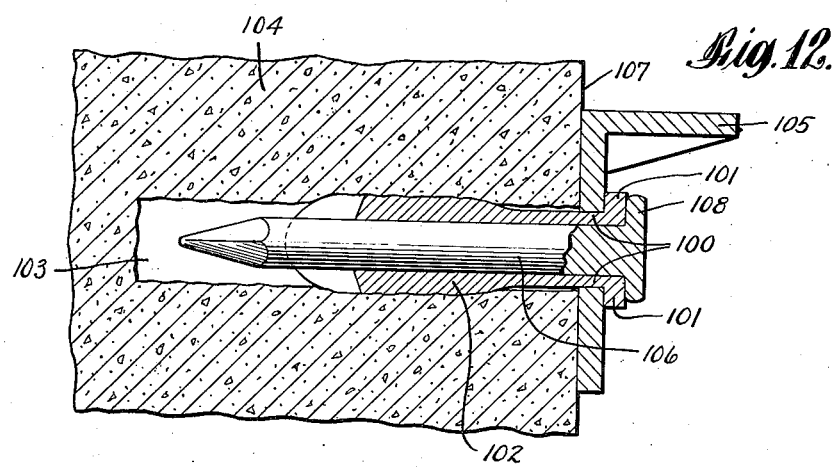
Figure 13:
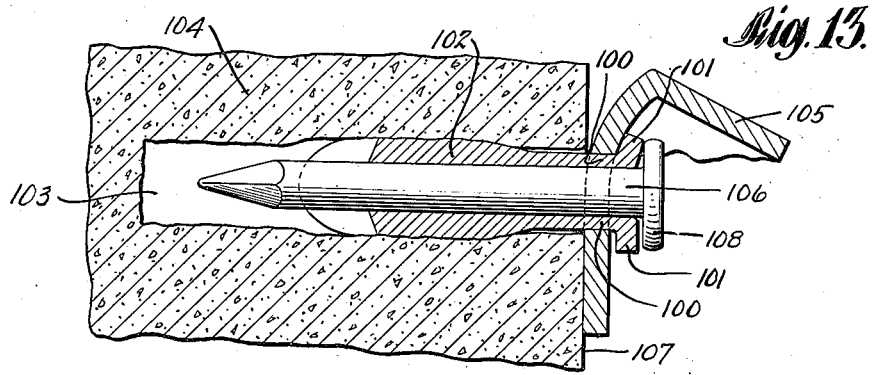
Figure 14:
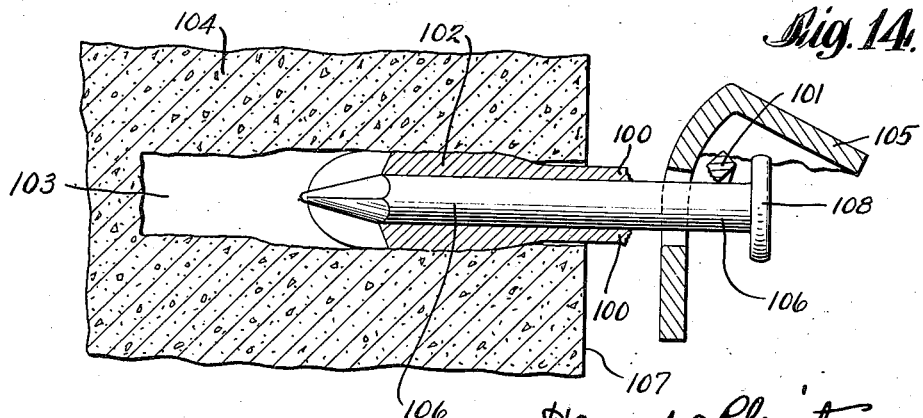

Figs. 12, 13 and 14 illustrate how the old form fails under an excessive overload, these figures being filed in compliance with Section 4888 of the Revised Statutes, because without these figures it is difficult or impossible to comply with this section of the Revised Statutes. Fig. 12 is a vertical section of a wall or other support of brick, concrete, stone, or other hard material, the work 105 and other parts being in section.

Fig. 13 is a vertical section similar to Fig. 12, showing the nail expansion failing under an excessive overload, and the work 105 beginning to pull the head 108 of the nail 106 to the right and away from the nail expansion shield 102.

Fig. 14 is a vertical section, similar to Fig. 13, showing the parts after the excessive overload on the work 105, has elongated the metal of the nail shield at 100, adjacent to the flanges or lips 101; these flanges or lips 101 are shown stripped from the nail shield 102, and the nail 106 is shown partially withdrawn from the nail shield 102. The next step in the failure (not shown) is where the nail is entirely withdrawn from the mutilated nail shield 102 which is left in the hole 103, the nail 106 falling with the work 105, and the severed flanges or lips 101—101.

The old form of nail shield 102, Figs. 12 to 14, such as covered by U. S. Patents 1,501,054 and 1,746,963 are first threaded through a hole in the work 105, and then into a previously drilled hole 103 in a wall or other support 104 of concrete, stone, brick, or other hard material. This leaves the flanges or lips 101—101 on the outside of the work 105. The nail 106 is then driven into the nail shield 102, to expand it, and the work 105 is firmly held against the surface 107 of the wall or other support 104, by the head 108 of the nail being driven against the flanges or lips 101—101, Fig. 12.

Under all normal loads the work 105 is securely held in place. But under excessive overloads, over and above what the nail expansion was installed to carry, allowing for its margin of safety, the weight or strain of the excessive overload will cause the nail expansion to fail, letting the work fall.

It has been found in testing machines where the nail expansions were tested to destruction, that the weakest portion of the nail expansion is that point 100, where the flanges or lips 101—101 join the main body of the nail shield 102.

When an excessive load or strain is thrown on the work 105, the strain or stress may be at an angle to the longitudinal axis of the nail expansion 102, Fig. 13. The first effect of the excessive load is transferred by the work 105 to the flanges or lips 101—101, Fig. 13. This sets up a transverse slide, or movement between the under surface of the nail head 108, and the flanges or lips 101—101. At the same time, this stretches the metal of the nail shield 102 at points 100—100, and partially pries the nail 106 from the nail expansion 102, as the excessive overload flattens out, or tends to flatten out, the flanges or lips 101—101 by making them slide on the under surface of the nail head 108, Fig. 13.

The excessive overload will either cause the ends of the flanges or lips 101—101 to slide down the under surface of the nail head 108, until they are parallel with the body of the nail expansion 102, or they will break off from the nail shield, as shown in Fig. 14.

In either event, the nail 106 will be withdrawn from the nail shield 102, and the work 105, with the nail 106 will fall to the ground, leaving all or part of the nail shield 102 in hole 103. Should the flanges or lips 101—101 break off, then the work 105, the nail 106, and the flanges or lips 101—101 will fall to the ground, leaving a mutilated nail shield 102 in the hole in the wall, Fig. 14.

My present invention is to strengthen the nail expansion by forming cooperating locking surfaces between the under surface of the nail head, and the flanges or lips 101—101, which will prevent relative transverse movement between the head of the nail 108 and the flanges or lips 101—101.

These locking surfaces will prevent an excessive overload on the work 105, causing the flanges or lips 101—101 to move on the under face of the head of the nail to withdraw, or partially withdraw, the nail 106 from the nail shield 102.

In other words, these cooperating locking surfaces lock the head 108 of the nail 106 to the flanges 101—101, and cause the nail and nail shield to exert their full bond or grip on the wall or support to resist the strains and stresses of the excessive overload on the flanges or lips. These locking surfaces prevent the prying, or other action, on the under surface of the head of the nail (Fig. 13) which starts the nail withdrawing from the nail shield 102.

It will be seen that these locking surfaces between the under face of the head of the nail and the flanges or lips 101—101 will insure that the maximum bond or grip of the complete expanded nail shield 102 will be exerted to counteract the excessive strains and stresses, and hold the work in place, and that this maximum bond or grip will not be weakened by the excessive overload flattening out, or tending to flatten out, or breaking off, the flanges or lips 101—101, permitting the work 105 to withdraw the nail 106 from the shield 102, thereby losing the advantage of the bond or grip of the expanded nail shield 102 in the hole 103, to counteract the excessive overload on the work 105.

With the description heretofore given, my invention will be clear.

I provide my nail shield 2 formed of any suitable material, with the longitudinal bore 10, and with flanges 1, 1 and with a slot, all as in the patents previously referred to herein.

The flanges or lips 1, 1 are provided with cooperating locking surfaces, 12, 12, which, in this preferred form, are radial grooves 13, 13.

Figure 1:
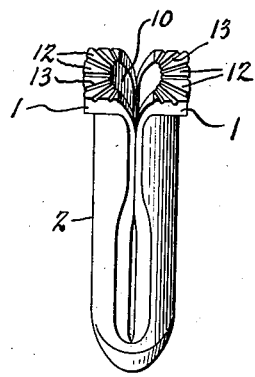
Fig. 1 is a perspective view of my nail fastener shield.
Figure 2:
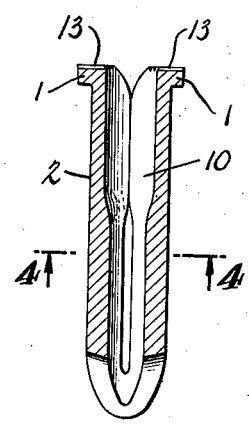
Fig. 2 is a longitudinal vertical section.
Figure 3:
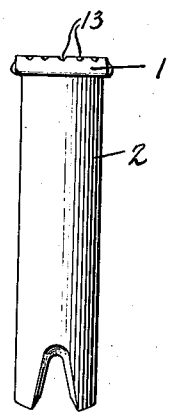
Fig. 3 is a side elevation.
Figure 4:
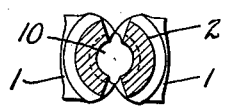
Fig. 4 is a transverse section on line 4—4 of Fig. 2, looking in the direction of the arrow.
Figure 5:
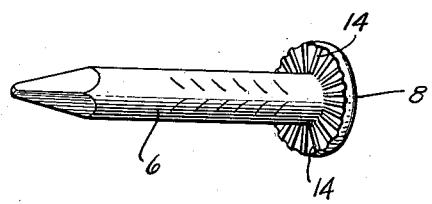
Fig. 5 is a perspective view of the nail, forming a part of my nail expansion.

These grooves 13 may be formed in the flanges by the ribs 14 on the nail, as the nail is driven home. The nail or driven member 6 has a head 8, the underface of which is provided with cooperating locking surfaces to cooperate with the locking surfaces 12, on the flanges or lips 1, 1. In the preferred form, Fig. 5, the underface of the nail head is provided with radial ribs 14, 14.

In use the nail shield 2 is threaded through a hole (not shown) in the work 5 and then, inserted in the hole 3 in the brick, concrete, stone or other suitable hard material forming the wall or support 4, the flanges or lips 1, 1 being on the outside of the work 5.

The nail or driven member 6 is then driven into the nail shield and expands it in the hole 3, as is usual.

Figure 6:
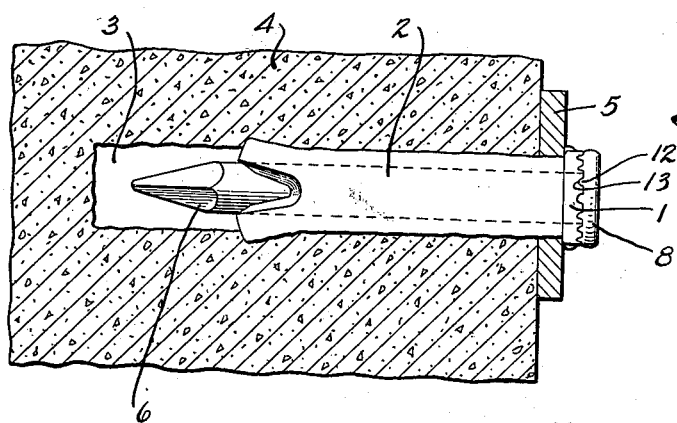
Fig. 6 is a horizontal section through a wall, or other support, and the work supported, the nail expansion being shown in plan.

The nail is driven into the nail shield until its locking surfaces 14 cooperate with the locking surfaces 13, 13 on the flanges or lips 1, 1, see Figs. 6 and 7.

When an excessive overload is thrown upon the work 5, the work will sustain it because the cooperating locking surfaces 14, 13 on the head of the nail or driven member 6, and on the flanges or lips 13, 13 respectively, will not permit relative transverse movement between the flanges 1, 1 and the head 8 of the nail or driven member 6. Without this lateral movement (Fig. 13) the excessive overload on the work 5 cannot pry out the nail 6 from the nail fastener 2 (see Fig. 13). This insures that the total bond or grip of the expanded nail shield 2 in the hole 3 will be available to take up the additional strains and stresses of the excessive overload. Any reasonable excessive load will, therefore, be successfully counteracted, the work 5 will remain in position, and the flanges 1, 1 will not be bent down parallel with the nail or driven member, nor will they be sheared off as in Fig. 14.

Of course it is possible that a tremendous overload thrown upon the work 5 may cause it to bend or fail, as shown in Fig. 8. But in bending or failing, it will not cause the flanges or lips 1, 1 to exert a sliding and prying action on the under face of the head of the nail or driven member 8, to withdraw the nail or driven member wholly, or partially, from the expanded nail shield 2, because the locking surfaces 13, 13 on the flanges or lips, and the locking surfaces 14, 14 cooperating with them and located on the under face of the nail head, will prevent such action (Fig. 8). This insures that the maximum grip or bond of the expanded nail shield 2 in the hole 3 will not be lessened or impaired by such a partial or complete withdrawal of the nail 6.

In Figs. 9 to 11 inclusive I have shown a modified form of nail expansion.

In this form the nail shield 50 is similar to the other form, but is provided with cooperating locking surfaces 51, 51 in the form of arcuate grooves in the flanges or lips 52, 52. The nail 53 is provided with a cooperating locking surface 54 in the form of a circular ridge or ring to cooperate with the arcuate locking grooves 51, 51. Figure 11 is a fragmentary section showing how the circular locking surface 54 fits into and cooperates with the arcuate locking grooves 51, 51 in the flanges or lips 52, 52. They perform the same function as the locking surfaces in the preferred form previously described, and may be formed in the same way.

In all forms, the metal of the nail shield is preferably of somewhat softer metal than the head of the nail, so that by simply driving the nail home, causes the locking surfaces to automatically cooperate and lock the nail to the nail shield. The locking surfaces do not have to exactly register for the protruding locking surfaces on the nail will be more or less imbedded in the softer metal of the nail shield 2. In some cases the undersurface of the nail head may be provided with one or more protruding locking members, and the flanges or lips may be plain. In such a form the locking members or member on the undersurface of the head form their own locking surfaces in the softer metal of the flanges or lips, as the nail is driven home.

For ready reference, I have referred to the element 6 as a nail, or a nail or driven member. It is to be understood that this driven member is part of the complete expansion. The expansible shield cannot operate without the driven member to expand it.

The two members form a complete combination, each cooperating with the other. The element 6 is not an ordinary nail, because it has projections on the under-surface of its head to lock with the flanges 1—1 of the shield, in any position in which the driven member may be inserted in the axial bore of the shield, for purposes fully described in the specification.

I am aware that a patent has been granted to Guss, No. 337,765 on March 9, 1886, for cut nails provided with wedge supports C, C, to form a bracket to support the head B of the nail, and keep it from being separated from the shank by the blows of a hammer. Such a nail could not be successfully used with my shield because, among other reasons, each nail will have to be accurately located in the axial bore of the shield, so that the wedges C, C, forming the support for the head, would not be adjacent to, or in line with, the parting line between the two expansible parts of the shield. Should the wedges C, C follow the parting line, they would force the two members of the shield apart without contacting with the flanges 1—1. Therefore, the wedges C, C would not cooperate with the flanges 1—1 to lock them to the head of the nail, with all the advantages set forth in this specification.

If the wedges C, C should be in line with the meeting surfaces of the two parts of the shield, when the mechanic inserted the nail within the axial bore of the shield, the shield would be expanded at the surface of the wall, rather than at the bottom of the hole in the wall, causing the surface around the hole to chip or spall, thereby defacing the wall or other support. Further, the wedges C, C, if placed so as to contact with the flanges 1—1 would, as the nail is driven home, cut through the flanges, thereby permitting the nail fastener to fail, as illustrated in Figs. 13 and 14.

Having thus described this invention in connection with illustrative embodiments thereof, to the details of which I do not desire to be limited, what is claimed as new and what is desired to secure by Letters Patent is set forth in the appended claims.

What I claim is:

1. In a nail expansion the combination of a metal expansion shield having a plurality of flanges or lips provided with locking surfaces, and an expanding nail provided with cooperating locking surfaces on the underside of its head to prevent lateral displacement of the flange relative to the head.

2. A new article of manufacture, comprising a nail shield, having a plurality of flanges or lips, provided with radially extending locking means, adapted to cooperate with similar locking means on an expanding nail to prevent lateral displacement of the flange relative to the head.

3. A new article of manufacture for a nail expansion, comprising a nail having one or more radial projections on the underside of its head, to cooperate with cooperating radial projections on a nail shield to prevent lateral displacement of the flange relative to the head.

4. The combination in a nail expansion of a metal expansion shield, having an axial bore, and adapted to be located in a hole in a wall or other support, said shield being provided with a flange adapted to extend out of the hole, and a driven member provided with a head and a locking surface on the under face of the head, adapted to engage with the flange of the shield, and lock the shield and the driven member together in any position that the driven member may be inserted in the axial bore of the shield to prevent lateral displacement of the flange relative to the head.

5. The combination in a nail expansion of a metal expansion shield, having an axial bore, and adapted to be located in a hole in a wall or other support, said shield being provided with a flange adapted to extend out of the hole, a driven member formed of harder metal than the shield, having a head provided on its under surface with a locking surface adapted to be driven into the flange, to hold the shield and driven member together, in any position that the driven member is inserted in the axial bore of the shield, to increase the holding power of the nail expansion and to prevent lateral displacement of the flange relative to the head.

HENRY W. PLEISTER.